(12) United States Patent
Kim (10) Patent No.: US 7,173,354 B2
(45) Date of Patent: Feb. 6, 2007

(54) FLAT NONCOMMUTATOR VIBRATION MOTOR

(75) Inventor: Jung-Hoon Kim, Dalseo-Gu (KR)

(73) Assignee: J&J Corp., Daegu (KR)

( * ) Notice: Subject to any disclaimer, the term of this patent is extended or adjusted under 35 U.S.C. 154(b) by 152 days.

(21) Appl. No.: 10/496,340

(22) PCT Filed: Aug. 30, 2002

(86) PCT No.: PCT/KR02/01650

§ 371 (c)(1),
(2), (4) Date: May 21, 2004

(87) PCT Pub. No.: WO03/049255

PCT Pub. Date: Jun. 12, 2003

(65) Prior Publication Data

US 2004/0256930 A1 Dec. 23, 2004

(30) Foreign Application Priority Data

Dec. 6, 2001 (KR) ............... 2001-37688

(51) Int. Cl.
*H02K 21/26* (2006.01)
*H02K 7/065* (2006.01)
(52) U.S. Cl. .................... 310/81; 310/156.32
(58) Field of Classification Search ............. 310/81, 310/156.32, 179, 40 MM, 180, 193
See application file for complete search history.

(56) References Cited

U.S. PATENT DOCUMENTS

| | | | | |
|---|---|---|---|---|
| 2,139,012 A | * | 12/1938 | Gillen | .................... 310/46 |
| 3,495,114 A | * | 2/1970 | Vasily | .................... 310/179 |
| 3,719,845 A | | 3/1973 | Takeda | .................... 310/268 |
| 3,984,709 A | * | 10/1976 | Kuwako et al. | ...... 310/40 MM |
| 4,125,792 A | * | 11/1978 | Schmider | .................... 310/268 |
| 4,634,906 A | * | 1/1987 | Grosjean | .................... 310/49 R |
| 4,733,119 A | | 3/1988 | Shiraki et al. | .................... 310/268 |
| 4,886,664 A | * | 12/1989 | Jung et al. | .................... 424/93.4 |
| 4,891,537 A | * | 1/1990 | Shiraki et al. | .................... 310/68 B |
| 4,961,017 A | * | 10/1990 | Kakinoki et al. | .................... 310/71 |
| 5,177,389 A | * | 1/1993 | Schalk | .................... 310/171 |

(Continued)

FOREIGN PATENT DOCUMENTS

| | | |
|---|---|---|
| JP | 1-91643 A | 4/1989 |
| JP | 3-107347 A | 5/1991 |
| JP | 5-146133 A | 6/1993 |

*Primary Examiner*—Darren Schuberg
*Assistant Examiner*—Erik Preston
(74) *Attorney, Agent, or Firm*—Birch, Stewart, Kolasch & Birch, LLP (57) ABSTRACT

Disclosed is an improved flat vibration motor to be disposed in a mobile communication terminal, etc. for generating a vibration signal. A brushless-type vibration motor without brushes and a commutator is adopted, instead of a brush-type vibration motor with the brushes and commutator. An eccentric portion is disposed on one side of the peripheral surface of a rotor made of a permanent magnet, and one or more pairs of hall sensors are mounted in the vibration motor so as to start and drive the vibration motor. A motor controller may be used as internally or externally disposed on the vibration motor. The arrangement of a stator coil is improved so as to reduce the loss of magnetic flux as well as remove the non-operation points, thereby preventing the starting and driving disorders of the vibration motor, and improving its performance and efficiency.

10 Claims, 8 Drawing Sheets

U.S. PATENT DOCUMENTS

| | | | |
|---|---|---|---|
| 5,382,890 A * | 1/1995 | Moh et al. | 318/254 |
| 5,589,722 A * | 12/1996 | Sakaguchi et al. | 310/180 |
| 5,648,693 A * | 7/1997 | Katoh et al. | 310/67 R |
| 5,982,069 A * | 11/1999 | Rao | 310/208 |
| 6,144,126 A * | 11/2000 | Kodama | 310/68 B |
| 6,465,921 B1 * | 10/2002 | Horng et al. | 310/81 |
| 6,636,007 B2 * | 10/2003 | Hong et al. | 318/114 |
| 6,713,924 B1 * | 3/2004 | Fukushima | 310/179 |
| 2002/0047369 A1 * | 4/2002 | Yoshida et al. | 310/81 |
| 2002/0195890 A1 * | 12/2002 | Sun | 310/81 |

* cited by examiner

FLAT NONCOMMUTATOR VIBRATION MOTOR

TECHNICAL FIELD

The present invention relates to an improved flat vibration motor to be disposed in a mobile communication terminal, etc., for generating a vibration signal, and more particularly to a flat brushless-type vibration motor without brushes and a commutator, which is adopted instead of a brush-type vibration motor with the brushes and commutator, and includes eccentric means disposed on one side of the peripheral surface of a rotor made of a permanent magnet; one or more pairs of hall sensors mounted in the vibration motor so as to start and drive the vibration motor; a motor controller internally or externally disposed on the vibration motor; and a stator coil improved in arrangement so as to reduce the loss of magnetic flux as well as remove the non-operation points, thereby preventing the starting and driving disorders of the vibration motor, and improving its performance and efficiency.

BACKGROUND ART

Generally, a vibration motor is employed inside a mobile communication terminal such as a cellular phone to notify a user of an incoming call. A coin-shaped flat vibration motor, greatly reduced in size and thickness, is widely used to meet the requirements of smaller size, lighter weight and lower power consumption in the mobile communication terminal.

The flat vibration motor comprises mainly a permanent magnet as a fixed member and a rotor as a rotation member, and an electric connection between the power supply (+, -) and the rotor is made generally by brushes and a commutator.

In the early days, vibration was attained using an eccentric plate mounted on the output axis of the rotation motor, or a fan-shaped rotor made eccentric as a whole toward its one side and having three armature coils mounted thereon with no overlapped portion therebetween.

Such a fan-shaped vibration motor using the fan-shaped rotor includes an eccentric rotor having a plurality of armature coils spatially biased toward one side, an axial rod mounted in the center of the eccentric rotor, and an axial bearing and a case, both for supporting the eccentric rotor so that it is freely rotated with the help of the axial rod and the bearing. The fan-shaped vibration motor also includes a housing made of a bracket, a donut-shaped permanent magnet mounted on the bracket for providing magnetic flux to the eccentric rotor, brushes disposed inside the permanent magnet, a brush base inserted therein, and a commutator disposed on one surface of the eccentric rotor so as to be in sliding contact with the top of the brushes.

The vibration motor has such a structure that the eccentric rotor having the plurality of armature coils spatially biased toward one side is rotated; the permanent magnet is fixed; and the brush-type motor that receives the drive power through the brushes and commutator is adopted, thereby leading to the following problems.

That is, such problems are widely known that, because the vibration motor is small in size with a diameter around 10 mm, the brushes and commutator are weak in their structure and low in durability, in result, shortening the life span; the cost is increased due to difficulty in manufacturing the brushes and commutator; and spark and noise caused by the connection structure exerts a bad influence upon the operation of other various electronic devices.

Because other conventional vibration motors used in the mobile communication terminal, etc., also use brush-type motors each having an eccentric unbalancing weight without exceptions, they have the same problems. Only a noise filter, etc., is currently available to resolve these problems.

In addition, since the conventional vibration motors have large air gaps between the rotor coils that cause a relatively large amount of magnetic flux leakage, there are problems that the vibration motor is lowered in efficiency, and increased in power consumption, consequently reducing the lifetime of the mobile communication terminals.

DISCLOSURE OF THE INVENTION

Therefore, the present invention has been made in view of the above problems, and it is an object of the present invention to provide a flat brushless-type vibration motor without brushes and a commutator, instead of a brushless-type vibration motor currently being used for a mobile communication terminal.

It is another object of the present invention to provide a vibration motor wherein one or more pairs of hall sensors for detecting (sensing) magnetic poles and their positions of a permanent magnet rotor are disposed in a receiving space that is secured in an internal side of a stator of the vibration motor to which two or three field coils are fixed, so as to enable the starting and driving of the vibration motor, and a controller of the vibration motor is mounted in one of two available mounting positions, one in the receiving space, and the other externally.

It is a further object of the present invention to provide a vibration motor wherein the hall sensors are integrated as one body with an integrated circuit (IC) element for controlling the vibration motor so as to simplify the entire circuit and reduce the manufacturing cost.

It is yet another object of the present invention to provide a vibration motor wherein the stator field coils are improved in arrangement for reducing the loss of magnetic field; and the field coils are disposed to be overlapped with each other, or the boundary between the field coils is not coincident with the virtual line outwardly extending from the centerline of the axial rod in a radial direction, so as to remove the non-operation points, consequently preventing operating disorders and further improving its efficiency and performance.

In accordance with the present invention, the above and other objects can be accomplished by the provision of a noncommutator vibration motor comprising: upper and lower cases made of ductile magnetic material; a rotor made of a permanent magnet having two or more magnetic poles or a donut-shaped permanent; a ductile magnetic body bonded to the rear surface of the permanent magnet; stator field coils for generating a rotating magnetic field to rotate the permanent magnet; an axial rod on which the permanent magnet is axially mounted with a bearing; an insulating stator to which the axial rod and the field coils are fixed; one or more pairs of hall sensors for detecting the magnetic poles and their positions of the permanent magnet; a motor controller for controlling an overall operation of the vibration motor; and eccentric means fixed to one side of the peripheral surface of the permanent magnet.

Preferably, the insulating stator is defined at its one internal side with a receiving space to dispose therein one or more pairs of left and right hall sensors, the motor controller connected to the hall sensors, or the hall sensors integrated as one body with an integrated circuit element for controlling the motor, so that the hall sensors disposed in the receiving space can detect (sense) and control the magnetic poles (or their variations) and their positions of the rotor permanent magnet.

Preferably, the boundary between the field coils may not be coincident with or parallel to the virtual line outwardly extending from the center of the axial rod in a radial direction. Alternatively, field coils neighboring each other are overlapped in arrangement, so as to remove the non-operation points.

Preferably, the permanent magnet may be mounted eccentrically to the axial rod, instead of using eccentric means bonded to one side of the peripheral surface of the permanent magnet.

Preferably, the vibration motor controller may includes: the hall sensors; OP amps for comparing and outputting signals inputted from the hall sensors; a control unit for controlling the starting and driving of the motor; a plurality of motor drivers; and the field coils connected to the motor drivers, respectively.

Preferably, the control unit may include: a waveform shaping circuit for shaping the waveform of the signals inputted from the hall sensors; a logic circuit for determining the sequence of powers supplied to the field coils based on the shaped signal; a duty setting circuit for determining the output duty and the power-feed timing signal from the logic circuit; and switching means for determining and changing the power-feed direction with respect to the field coils, based on the output duty signal.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
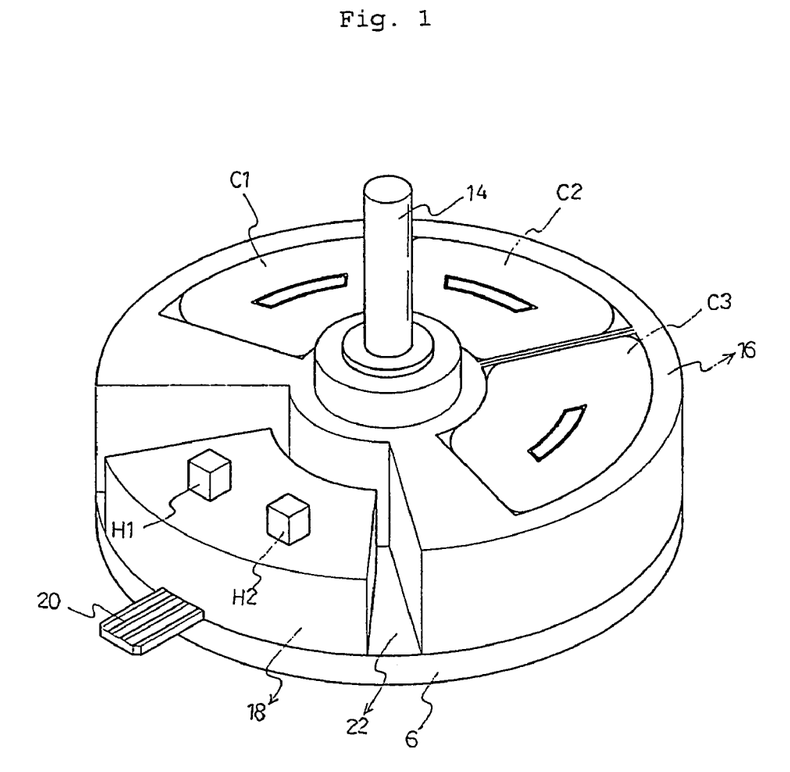
FIG. 1 is an outline perspective view showing a vibration motor of a preferred embodiment according to the present invention.
Figure 2:
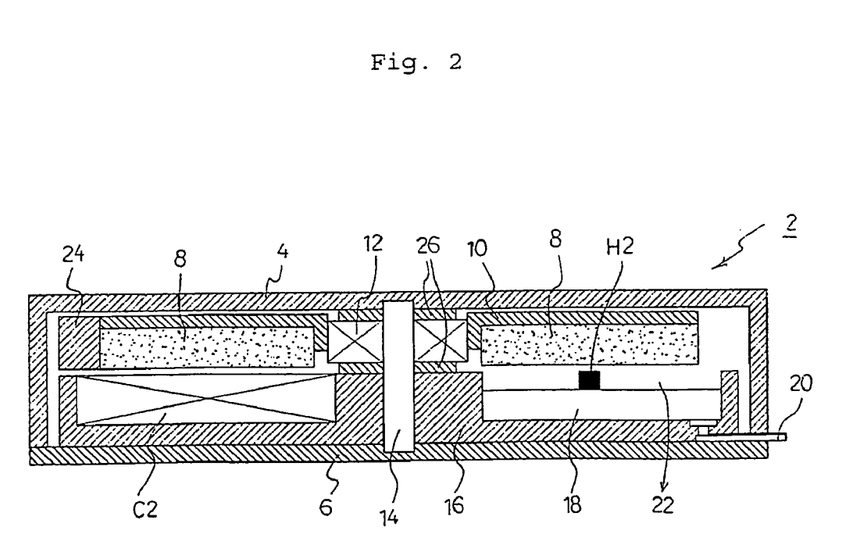
FIGS. 2 and 3 are sectional and plane views of FIG. 1.

FIGS. 1 and 2 are perspective-outline and sectional views, respectively, showing the main part of a flat brushless-type vibration motor 2 without brushes and a commutator, according to the present invention.

The vibrator motor 2 according to the present invention includes upper and lower cases 4 and 6 made of ductile magnetic material, a permanent magnet 8 as a rotor, a ductile magnetic body 10 bonded to the rear surface of the permanent magnet 8, and stator field coils C1, C2, and C3 for generating a rotating magnetic field so as to rotate the permanent magnet 8. An axial bearing 12 is fitted in the center hole of the ductile magnetic body 10. An axial rod is coupled to the center hole of the axial bearing 12. The axial rod 14 and the field coils C1, C2, and C3 are fixed to an insulating stator 16. The vibration motor 2 also includes one or more pairs of hall sensors (in the illustrated embodiment, H1 and H2) for detecting magnetic poles and their positions of the permanent magnet 8, a motor controller 18 for controlling the overall operation of the vibration motor 2, and a power-feed terminal 20 for transferring drive power and an external control signal to the vibration motor 2 and the motor controller 18, respectively. A receiving space 22 is defined for disposing therein the hall sensors H1 and H2 alone, or together with the motor controller 18. Eccentric means 24 is fixed to the peripheral surface of the permanent magnet 8.

In the present invention, the cases 4 and 6 and the ductile magnetic body are all made of a magnetic material that shows a property of magnetization by a magnet's approach and demagnetization by its removal. The cases 4 and 6 serve as a protector of their internal parts as well as a magnetic shield. A reference numeral 26 denotes a washer.

The permanent magnet 8 with two or more alternately-arranged magnetic poles (N or S) is mounted in such a manner that it faces the stator 16. Its rotation direction is determined based on the sequence of magnetic fields generated from the field coils C1, C2, and C3 by the motor controller 18.

The ductile magnetic body 10 prevents the magnetic field of the permanent magnet 8 from escaping backward as well as from being disturbed.

Figure 3:
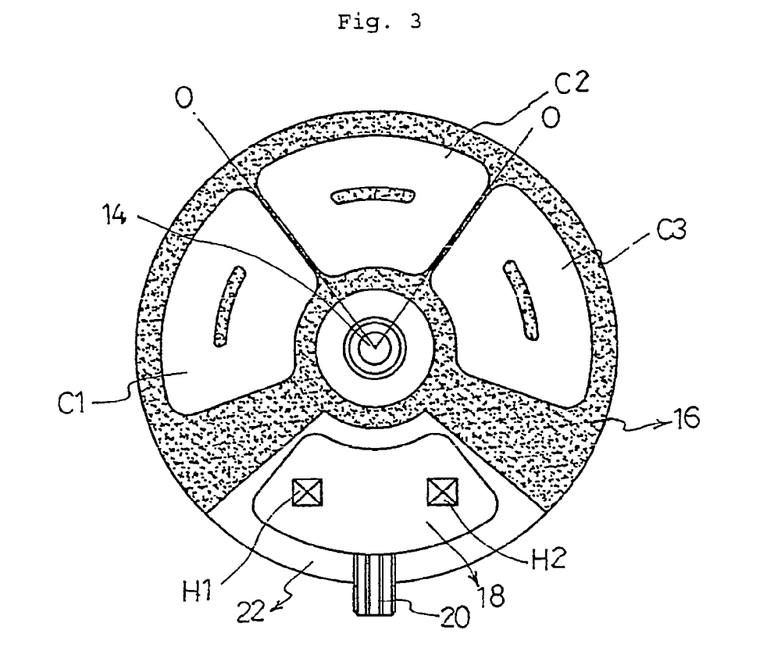
Figure 5:
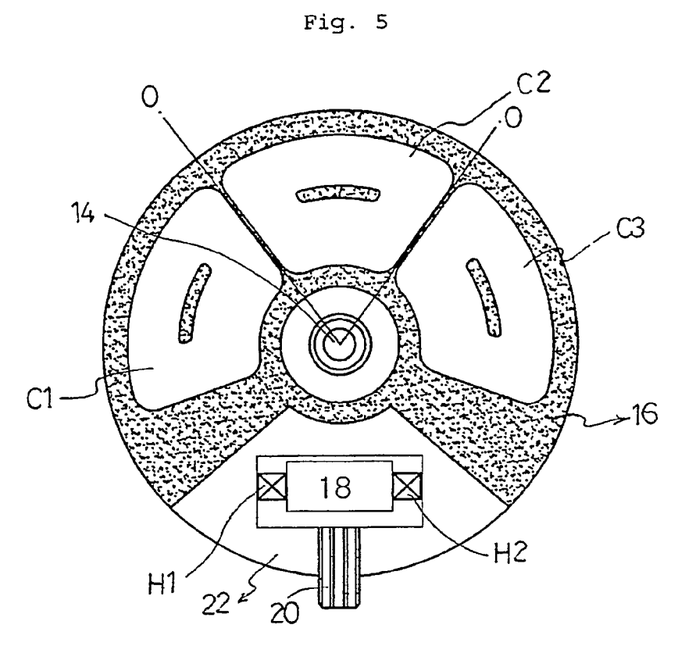

In addition, the hall sensors H1 and H2 are disposed in the receiving space 22 alone, combined with the motor controller 18 as shown in FIG. 3, or integrated into a one-chip IC element for controlling the vibration motor as shown in FIG. 5. The hall sensors H1 and H2, which are disposed to face the permanent magnet 8, detect the positions or variations of magnetic poles, and then the detected result is inputted to the motor controller 18.

That is, the hall sensors detect the rotor's position and input the detected signals to the motor controller 18.

Figure 4:
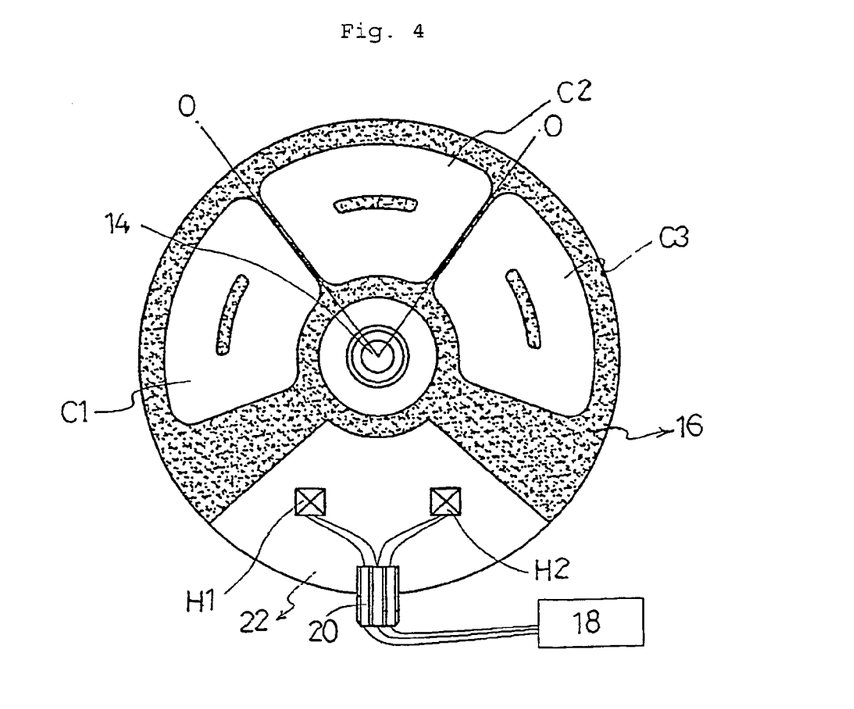
FIGS. 4 to 7 are plane views showing a vibration motor according to another embodiment of the present invention.

The motor controller 18 determines the sequence of powers supplied to the field coils C1, C2, and C3 during the operation of the vibration motor 2, based on the input signal mentioned above, for starting and driving the vibrating motor 2. The motor controller 18 is positioned internally in the vibration motor 2 as shown in FIGS. 3 and 5 in which it is disposed in the receiving space 22 together with the hall sensors H1 and H2. The motor controller may also be externally disposed on the vibration as shown in FIG. 4 in which it is electrically connected to the hall sensors H1 and H2.

As described above, the rotor includes the axial rod 14, the axial bearing 12, the permanent magnet 8, and eccentric means (unbalancing weight) 24 fixed or attached to one side of the peripheral surface of the permanent magnet 18. The axial bearing 12 is generally made of a metal bearing.

The field coils C1, C2, and C3 are made of fine-diameter conducting wires, such as enamel wires, wound to have a desired structure. Cores may be employed, and their omission is also permitted. But, it is preferable that at least two cores, or preferably three, are mounted on the stator 16 at positions corresponding to the permanent magnet 8 positioned above the cores.

The field coils C1, C2, and C3 and the axial rod 14 are molded into the insulating stator 16 by insertion molding, and the field coils C1, C2, and C3 are connected at their end portions to the motor controller 18 through the terminal 20.

A mounting-coverage angle of the eccentric means 24 of 180° or more, fixedly disposed along the peripheral surface of the permanent magnet, causes a decrease in the vibration force, and, on the other hand, mounting-coverage angle of less than 20° to 30° causes a decrease in the efficiency of the vibration motor, resulting in its overload. Therefore, according to the present invention, it is preferable that the mounting-coverage angle is determined in the range between an angle much higher than 20° to 30° and an angle much less than 180°, that is, around 100°. In addition, the amount of magnetic field sufficient for the smooth rotation of the vibration motor 8 is obtained when the sum of mounting-coverage angles of the field coils C1, C2, and C3 is set to more than 150°.

The unbalancing body as the eccentric means 24 is generally made of a weighty material with high specific gravity. Since the unbalancing body is fixedly attached to the peripheral surface of the rotor, the permanent magnet 8, it is also made of non-magnetic metal or non-metal weighty material so as to exert no influence upon the magnetic field of the permanent magnet 8.

Figure 15:
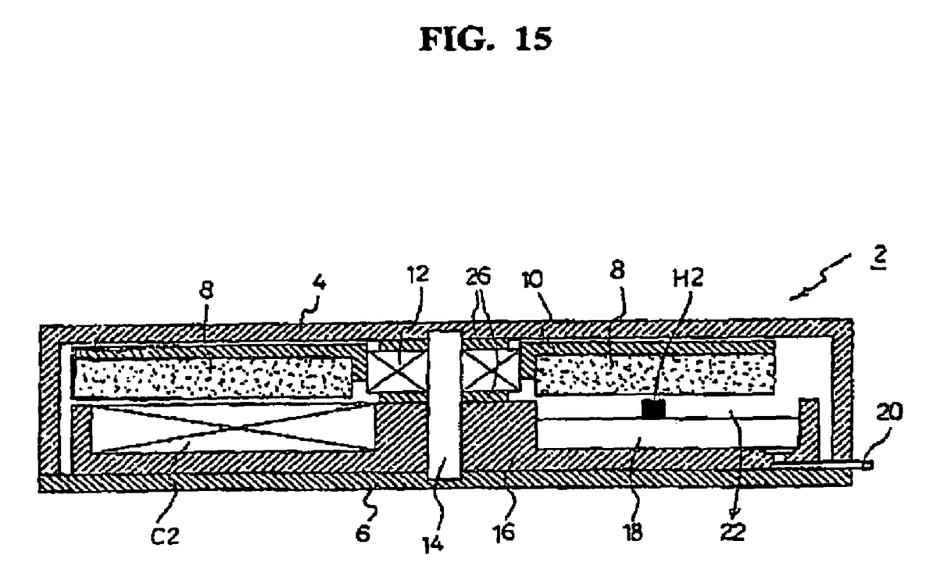
FIG. 15 is a sectional view showing an alternative arrangement to the embodiment of FIG. 2.

The reason why the eccentric means 24 is made of weighty material is to obtain the amount of eccentricity sufficient for causing the vibration, but the vibration may also be obtained by disposing the permanent magnet 8 eccentrically to the axial rod 14 without the unbalancing weight, as shown in FIG. 15.

When the vibration motor 2 is configured such that the rotor permanent magnet 8 is disposed eccentrically to the axial rod according to the present invention, the vibration motor can be manufactured in small size, removing separate eccentric means (unbalancing weight) to comply with the current smaller-size trend.

In addition, because the eccentric means 24 can be fixed to any position of the peripheral surface of the permanent magnet 8, it has an advantage in that there is no need to set the fixed position, making its manufacture easier.

In the stator 16 of the present invention, the biased arrangement of the field coils C1, C2, and C3 allows the receiving space 22 to be formed at one side thereof for disposing therein one or more pairs of hall sensors H1 and H2, or the motor controller 18 combined with the hall sensors H1 and H2.

Figure 6:
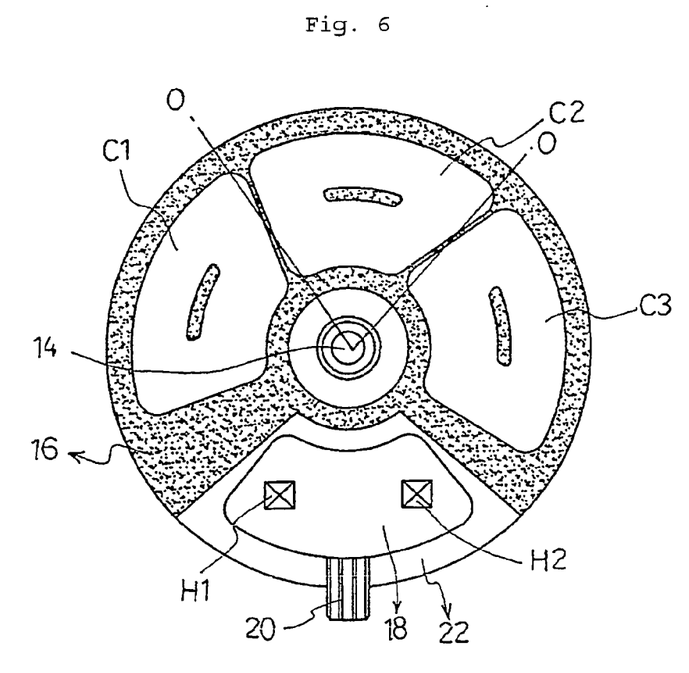
Figure 7:
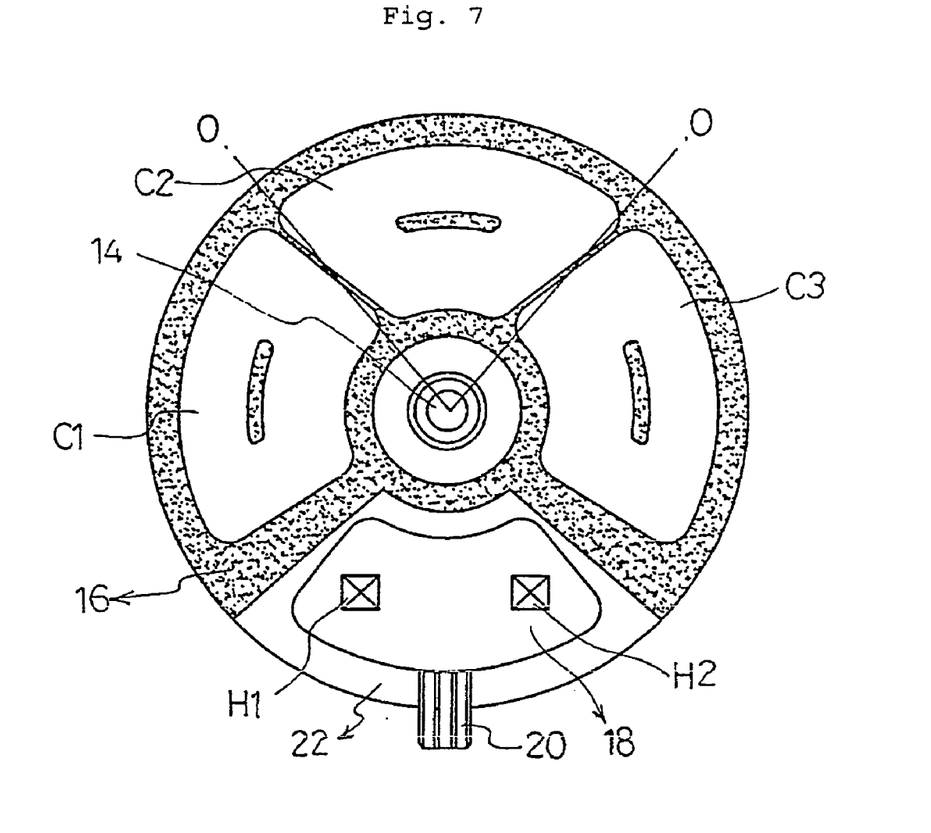

As shown in FIG. 3, when the boundaries between the field coils C1, C2, and C3 are coincident with or parallel to the virtual line O outwardly extending from the center of the axial rod 14 in a radial direction, non-operation points may be generated. Therefore, in the present invention, the field coils C1, C2, and C3 are disposed in the stator 16 in such a shape that the boundaries are not coincident with or parallel to the virtual line O as shown in FIGS. 6 and 7, so as to remove the non-operation points and prevent the operation disorder of the vibration motor 8.

Figure 8:
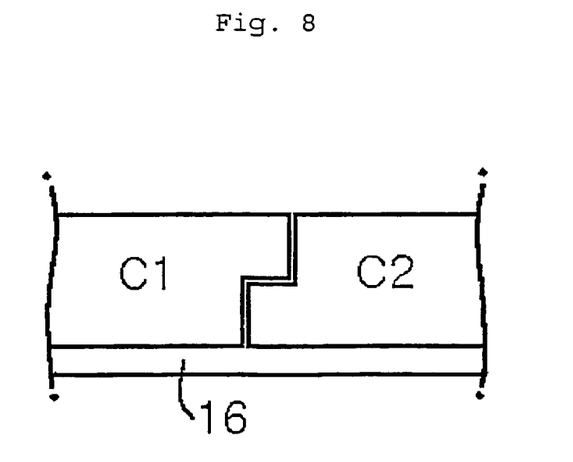
FIG. 8 is a vertical sectional view showing the vibration motor according to another embodiment of the present invention.
Figure 9:
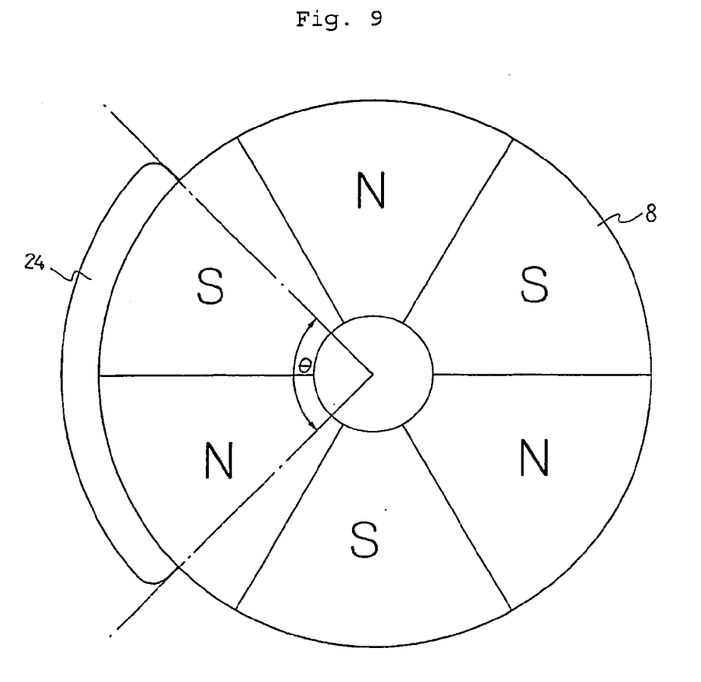
FIG. 9 is a plane view showing a permanent magnet (rotor) on which eccentric means is mounted.

In addition, the field coils C1, C2, and C3 are disposed in such a manner that the field coils C1 and C2 are vertically overlapped as shown in FIG. 8, and also the field coils C2 and C3 are also vertically overlapped, so that there is no in-plane boundary portion, thereby preventing operating disorders of the vibration motor 8, as well as improving its efficiency.

Figure 10:
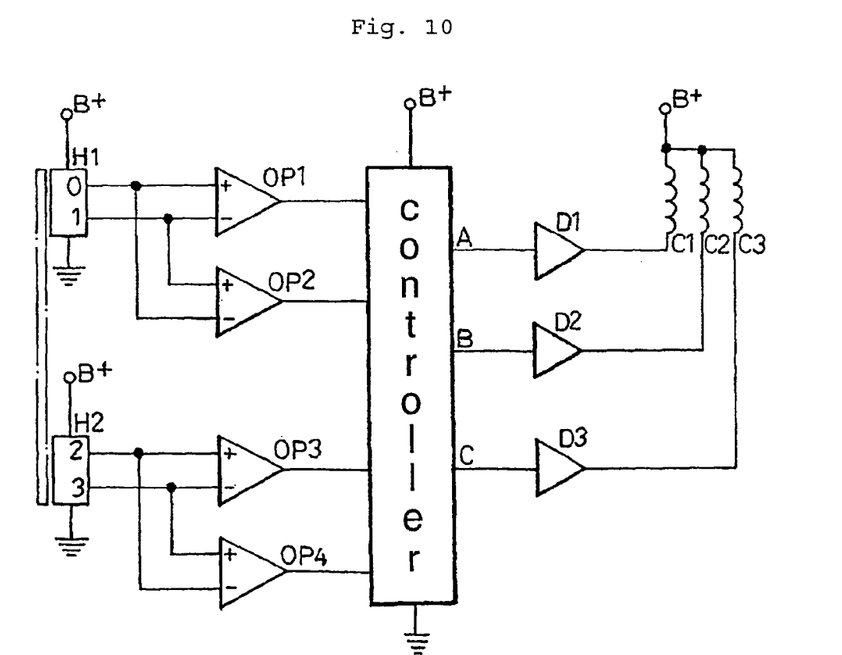
FIG. 10 is a block diagram showing a control circuit of a vibration motor controller according to the present invention.

FIG. 10 is a circuit diagram showing the controller 18 of the vibration motor, according to one embodiment of the present invention. The controller 18 includes the hall sensors H1 and H2, OP amps OP1 to OP4 for comparing and outputting signals from the hall sensors H1 and H2, and a control unit for controlling the starting and driving of the vibration motor 2a based on signals from the OP amps OP1 to OP4. The controller 18 also includes a plurality of motor drivers D1, D2, and D3 for amplifying the output from the control unit, and the field coils C1, C2, and C3 connected to the outputs of the motor drivers D1, D2, and D3, respectively.

The control unit includes therein a waveform shaping circuit (Schmitt-trigger circuit) for shaping the form of the signals from the hall sensors H1 and H2, and a logic circuit for determining the sequence of powers supplied to the field coils C1, C2, and C3, based on the shaped signal. The control unit also includes a duty setting circuit for setting the output duty and the power-feed timing signal from the logic circuit, and a switching circuit for determining and shifting the power-feed direction based on the output duty signal.

The following table shows the signal outputs from the hall sensors H1 and H2, for example, according to the magnetic poles or their positions of the permanent magnet 8 when it has six magnetic poles.

TABLE 1

(Example of signals from the hall sensors that detect the polarities of the permanent magnet with 6 magnetic poles)

| Address | | 1 | 2 | 3 | 4 | 5 | 6 |
|---|---|---|---|---|---|---|---|
| H1 | 0 | | H | | H | H | H |
| | 1 | H | | H | | H | H |
| H2 | 2 | H | | | H | | H |
| | 3 | | H | H | | H | |
| Output | | C1 | C3 | C1 | C2 | C3 | C2 |

Now, a description will be given of the starting and driving states of the vibration motor 2 using the example of Table 1.

When signal 'H' (active) is provided to both the address 1 of the hall sensor H1 and the address 2 of the hall sensor H2 according to the position of the permanent magnet 8, power supply voltage is fed to the field coil C1, starting and driving the vibration motor 2. When signal 'H' is provided to the addresses 0 and 1 of the hall sensor H1 and the address 2 of the hall sensor H2, power supply voltage is fed to the field coil C2, starting and driving the vibration motor 2.

Of course, the present invention is not limited to the above-mentioned example, and the output state may be varied according to the number of magnetic poles of the permanent magnet 8 or its program.

Figure 11:
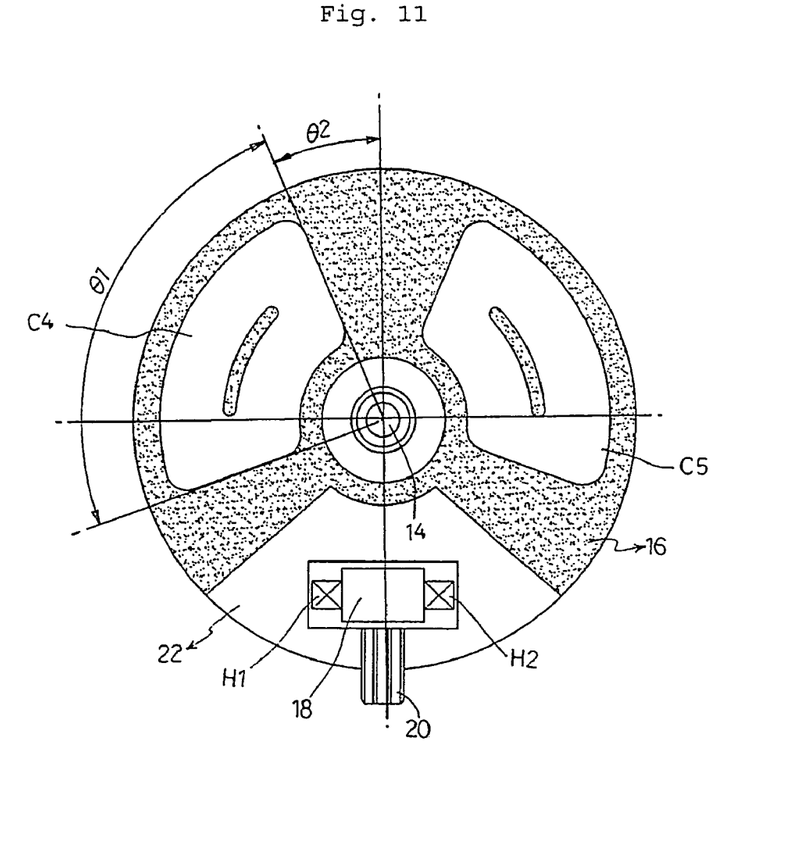
FIG. 11 is a plane view showing a vibration motor employing two field coils according to another embodiment of the present invention.
Figure 12:
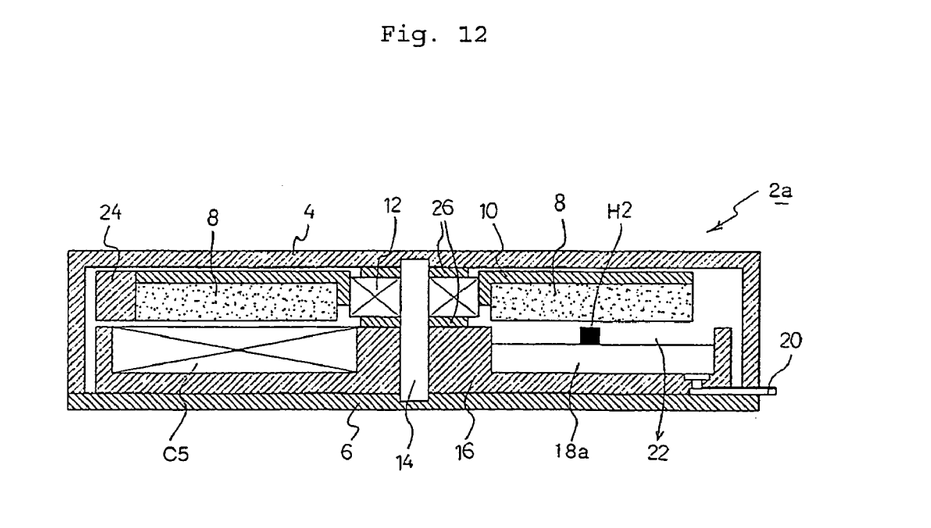
FIG. 12 is a sectional view of FIG. 11.

On the other hand, FIGS. 11 and 12 are schematic plane and sectional views showing the vibration motor 2a according to another embodiment of the present invention wherein the field coils C4 and C5 are positioned at both sides of the insulating stator 16. Its most parts are similar to those of the vibration motor 2 that employs three field coils C1, C2, and C3, but the field coils C4 and C5 are differently positioned in arrangement because the number of field coils C4 and C5 is two. Therefore, there are differences also in the circuit for supplying the control power to the two field coils C4 and C5 as well as in the control timings for rotating smoothly the rotor (permanent magnet).

That is, the vibration motor 2a includes upper and lower cases 4 and 6, the rotor permanent magnet 8, the ductile magnetic body 10 attached to the rear surface of the rotor permanent magnet 8, and the stator field coils C4 and C5 for generating the rotating magnetic field to rotate the permanent magnet 8. An axial bearing 12 is coupled to the center axial hole of the ductile magnetic body 10. An axial rod 14 is coupled to the center hole of the axial bearing 12. The axial rod 14 and the field coils C4 and C5 are fixed to an insulating stator 16. The vibration motor 2a also includes one or more pairs of hall sensors H1 and H2 for detecting the magnetic poles and their positions of the permanent magnet 8, a motor controller 18a for controlling the overall operation of the vibration motor 2, and a power-feed terminal 20 for transferring the drive power and the external control signal to the vibration motor 2 and the motor controller 18a, respectively. A receiving space 22 is defined for disposing therein the hall sensors H1 and H2 alone, or together with the motor controller 18a. Eccentric means 24 is fixed to the peripheral surface of the permanent magnet 8.

The field coils C4 and C5 may be radially disposed, respectively, in both left and right sides of the insulating stator 16 for the smooth operation of the vibration motor 2a. However, because the receiving space 22 is positioned at one internal side of the insulating stator 16, both the field coils are positioned so as not to be directly opposite to each other, as shown in FIG. 11, being aside from the receiving space 22.

The field coils C4 and C5 are disposed symmetrically with respect to the vertical centerline. It is preferable that the mounting-coverage angle θ1 of the field coil C4 is around 90° and the angle θ2 between the vertical centerline and the field coil C4 is around 15° so as not to negatively influence the starting and driving of the vibration motor 2a while securing the space margin for the receiving space 22 and the hall sensors H1 and H2.

The permanent magnet 8 with two or more alternately-arranged magnetic poles N and S is disposed so as to face the stator 8. The starting and the driving direction (rotation direction) are determined based on the sequence of magnetic fields generated from the field coils C4 and C5 by the motor controller 18a.

In addition, one or more pairs of hall sensors H1 and H2 are disposed, facing the permanent magnet 8, in the receiving space 22 alone or combined with the motor controller 18a, or unified or integrated as one chip with an IC element for controlling the vibration motor 2a. The hall sensors H1 and H2 detect the variations or positions (or rotor's position) in the magnetic poles of the permanent magnet 8 and then input them to the motor controller 18a.

Figure 13:
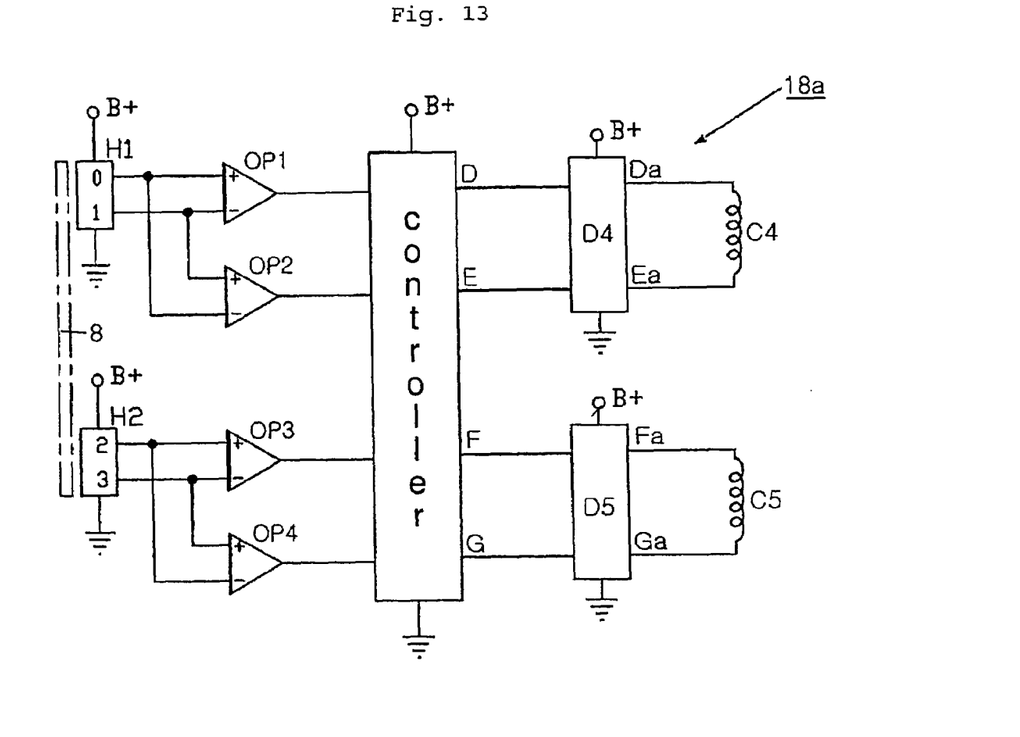
FIG. 13 is a block diagram showing a control circuit of the vibration motor shown in Fig. 11.

FIG. 13 is a block diagram showing a control circuit of the vibration motor 2a according to another embodiment of the present invention. This is mostly similar to the circuit shown in FIG. 10. But, since the number of field coils C4 and C5 connected to the output of the control unit is two and the field coils C4 and C5 alternately generate the magnetic poles N and S, the number of drivers D4 and D5 having the function of changing the polarity (+, −) of power source voltage is set to two, and the field coils C4 and C5 are connected to the outputs of the driver D4 and D5, respectively.

The motor controller 18a determines the shift-timing of the voltage polarity (+) (−) applied to the field coils C4 and C5 during the starting and driving of the vibration motor 2a, based on the position of the rotor inputted from the hall sensors H1 and H2, so as to start and drive the vibrating motor 2. The motor controller 18a may be positioned internally in the vibration motor 2, as mentioned above, in which it is disposed in the receiving space 22 together with the hall sensors H1 and H2. The motor controller 18a may also be externally disposed on the vibration motor 2, in which it is electrically connected to the hall sensors H1 and H2.

In addition, the control unit includes therein a waveform shaping circuit for shaping the form of signals from the hall sensors H1 and H2, and a switching circuit and a logic circuit for determining and changing the shift-timing of the voltage polarity (+) (−) and the sequence of powers supplied to the field coils C4 and C5 based on the shaped signal.

In the driver D4, the polarity (+) (−) of power supply voltage applied to the field coil C4, as well as the magnetic field of the field coil C4, is changed according to the output state of the terminals D and E connected to the outputs of the control unit. Also, in the driver D5, the polarity (+) (−) of power supply voltage applied to the field coil C5, as well as the magnetic field of the field coil C4, is changed according to the output state of the terminals F and G connected to the outputs of the control unit.

For example, when signal 'H' (active) is outputted from the output terminal D of the control unit, and signal 'L' is outputted from the output terminal E thereof, the voltage of polarity (+) is outputted from the output terminal Da of the driver D4, and the voltage of polarity (−) is outputted from the output terminal Ea of the driver D4. During this period, an S-pole magnetic field is generated from the field coil C4.

On the contrary, when signal 'L' is outputted from the output terminal D of the control unit, and signal 'H' is outputted from the output terminal E thereof, the voltage of polarity (−) is outputted from the output terminal Da of the driver D4, and the voltage of polarity (+) is outputted from the output terminal Ea of the driver D4. During this period, an N-pole magnetic field is generated from the field coil C4.

In addition, when signal 'H' (active) is outputted from the output terminal F of the control unit, signal 'L' is outputted from the output terminal G thereof, the voltage of polarity (+) is outputted from the output terminal Fa of the driver D5, and the voltage of polarity (−) is outputted from the output terminal Ga of the driver D5. During this period, S-pole magnetic field is generated from the field coil C5.

On the contrary, when signal 'L' is outputted from the output terminal F of the control unit, and signal 'H' is outputted from the output terminal G of thereof, the voltage of polarity (−) is outputted from the output terminal Fa of the driver D5, and the voltage of polarity (+) is outputted from the output terminal Ga of the driver D5. During this period, an N-pole magnetic field is generated from the field coil C5.

Figure 14:
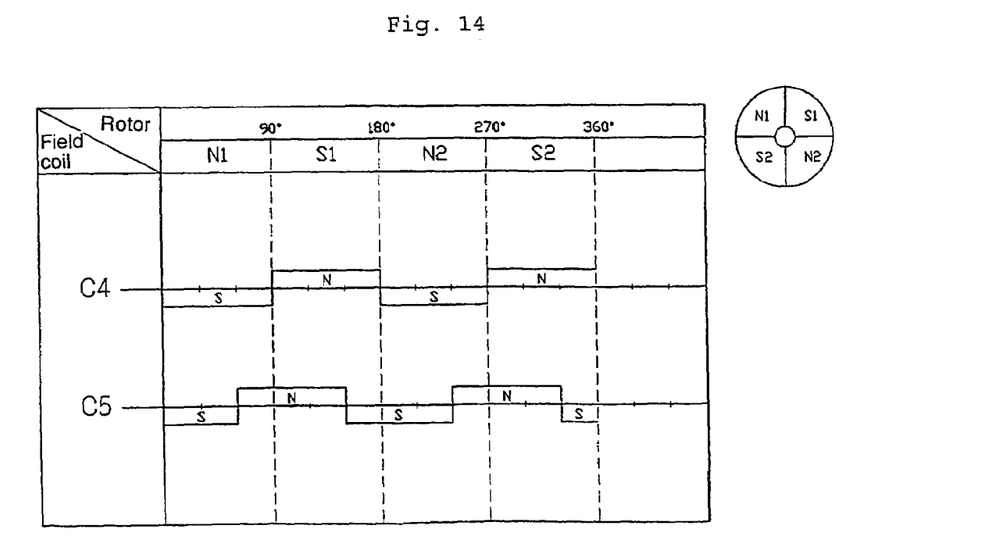
FIG. 14 is a timing chart regarding the control circuit of FIG. 13.

FIG. 14 is a timing chart illustrating the starting and driving of the vibration motor 2a according to said another embodiment of the present invention.

That is, when the initial position signal of the rotor inputted to the hole sensor H1 is N (N1), power supply voltage is fed to the field coil C4 by the controller 18a to generate S-pole magnetic field, causing magnetic attraction that allows rotation of the rotor toward the field coil C4. With the rotor being rotated about 60°, power supply voltage is fed to the field coil C5 to generate an N-pole magnetic field, causing a magnetic force to attract the magnetic pole S1 of the rotor. In such operation, a phase difference of 30° between the field coils C4 and C5 causes continued change in the magnetic field, allowing driving of the vibration motor 2a and its eccentric rotation.

In this another embodiment, the number of field coils C4 and C5 is two, so that the stator and the control circuit may be formed in simple manner, and also the manufacturing cost and the weight may be reduced.

In the present invention, a hall sensor, one of magnetic-sensitive elements, is used, as an example, for detecting the magnetic poles N and S of the permanent magnet 8. However, other magnetic-sensitive elements may also be used, such as a lead switch, a read switch, a magnetic resistance element, a thermo-magnetic sensitive element, a magnetic diode, a magnetic transistor, and a magnetic thyrister. The other available elements are a photo sensor, an image sensor, a proximity sensor, etc.

When using the photo sensor, the image sensor, or the proximity sensor, a plurality of reflectors may be formed in a predetermined arrangement on a surface of the permanent magnet at position corresponding to the sensors. Alternatively, an image reflector may be formed thereon in an arrangement according to differences in reflection or chromaticity, or detect-target means of the proximity sensor may be formed thereon.

INDUSTRIAL APPLICABILITY

The present invention adopts a brushless-type vibration motor without brushes and a commutator, instead of a brush-type vibration motor with brushes and a commutator. This makes the manufacturing process easier, and prevents problems experienced in the conventional vibration motor such as poor durability, short life span, and generation of spark and noise due to the connection structure, each caused by the small-size brushes and commutator.

In addition, the non-operation points are removed, preventing operating disorders, and the boundary between the field coils is narrowed or the in-plane boundary portion is removed to further reduce the leakage amount of magnetic field, thus attaining lower power consumption of the vibration motor, and improving the efficiency. This results in longer lifetime of the mobile communication terminal.

Further, in another embodiment that employs two field coils, the stator and the control circuit are simplified in structure to allow reduction in the manufacturing cost and the weight.

Furthermore, the motor controller can be mounted in the internal receiving space in the vibration motor, so that the space utilization becomes excellent, and also the hall sensors and the IC element for controlling the motor are made as one chip, thereby reducing the manufacturing cost and improving the reliability of operation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A flat brushless-typo vibration motor comprising:
   a rotor made of an axially-mounted permanent magnet with two or more magnetic poles;
   a ductile magnetic body bonded to a rear surface of the permanent magnet;
   three stator field coils arranged asymmetrically in a circumferential direction for generating a rotating magnetic field to rotate the permanent magnet;
   an insulating stator to which an axial rod and the field coils are fixed and defining a receiving space;
   one or more pairs of hall sensors for detecting the magnetic poles and their positions of the permanent magnet, said hall sensors disposed in said receiving space;
   a motor controller disposed in said receiving space for controlling an overall operation of the vibration motor; and
   eccentric means fixed to one side of a peripheral surface of the permanent magnet.

2. The flat brushless-type vibration motor according to claim 1, wherein the hall sensors are mounted on and electrically connected to the motor controller.

3. The flat brushless-type vibration motor according to claim 1, wherein the hall sensors are integrated with the motor controller in the form of a one-chip IC element.

4. The flat brushless-type vibration motor according to claim 1, wherein at least one boundary line between the field coils is not coincident with or parallel to a virtual line outwardly extending from a center of the axial rod in a radial direction, whereby there is no non-operation point.

5. The flat brushless-type vibration motor according to claim 1, wherein the field coils neighboring each other are disposed to be overlapped with each other in a circumferential direction, whereby there is no non-operation point.

6. The flat brushless-type vibration motor according to claim 1, wherein the motor controller comprises:
   the hall sensors for detecting the position of the permanent magnet;
   OP amps for comparing and outputting signals inputted from the hall sensors;
   a control unit for controlling starting and driving of the vibration motor with reference to signal inputted from the OP amps;
   a plurality of motor drivers for amplifying signals outputted from the control unit; and
   the field coils connected to the drivers, respectively.

7. A flat brushless-type vibration motor comprising:
   a motor made of an axially-mounted permanent magnet with two or more magnetic poles;
   a ductile magnetic body bonded to a rear surface of the permanent magnet;
   two stator field toils arranged asymmetrically in a circumferential direction for generating a rotating magnetic field to rotate the permanent magnet;
   an insulating stator to which an axial rod and the field coils are fixed and defining a receiving space;
   one or more pairs of hall sensors for detecting the magnetic poles and their positions of the permanent magnet, said hall sensors disposed in said receiving space;
   a motor controller disposed in said receiving space for controlling an overall operation of the vibration motor; and
   eccentric means fixed to one side of a peripheral surface of the permanent magnet.

8. The flat brushless-type vibration motor according to claim 7, wherein the motor controller includes:
   the hall sensors for detecting the position of the permanent magnet;
   OP amps for comparing and outputting signals inputted from the hall sensors;
   a control unit for controlling starting and driving of the vibration motor with reference to signals inputted from the OP amps;
   a plurality of drivers for shifting polarity (+) (−) of power supply voltage provided to the field coils according to signals outputted from the control unit; and
   the field coils connected to the drivers, respectively.

9. The flat brushless-type vibration motor according to claim 7, wherein the field coils are disposed, respectively, at both internal side of the insulating stator symmetrically with respect to a vertical centerline of the insulating stator; the mounting-coverage angle of one of the field coils is around 90°; and angle between the vertical centerline and one of the field coils is around 15°.

10. A flat brushless-type vibration motor comprising:
   a rotor made of an axially-mounted permanent magnet with two or more magnetic poles;
   a ductile magnetic body bonded to a rear surface of the permanent magnet;
   three stator field coils arranged asymmetrically in a circumferential direction for generating a rotating magnetic field to rotate the permanent magnet;

an insulating stator to which an axial rod and the field coils are fixed and defining a receiving space;

one or more pairs of ball sensors for detecting the magnetic poles and their positions of the permanent magnet, said hall dispensers disposed in said receiving space; and a motor controller disposed in said receiving space for controlling an overall operation of the vibration motor, wherein the rotor permanent magnet is disposed eccentrically to the axial rod so as to cause its vibration.

* * * * *